Patented Aug. 30, 1949

2,480,644

UNITED STATES PATENT OFFICE 2,480,644

PREPARATION OF dl-VALINE

Dale P. J. Goldsmith and Max Tishler, Rahway, N. J., assignors to Merck & Co., Inc., Rahway, N. J., a corporation of New Jersey No Drawing. Application October 31, 1946, Serial No. 707,030

2 Claims. (Cl. 260—534)

This invention relates to the manufacture of amino acids. More particularly, it is concerned with the synthesis of the amino acid, dl-valine.

It has now been discovered that dl-valine can be produced in a simple process which is considerably more economical than the available methods for producing this amino acid. Readily available, inexpensive reactants are employed to produce dl-valine in high yield at low cost.

Regarded in certain of its broader aspects, the process in accordance with the present invention comprises reacting isobutyraldehyde with an ammonium salt such as ammonium carbonate, ammonium bicarbonate or ammonium carbamate and an inorganic cyanide such as an alkali metal cyanide to form 5-isopropyl hydantoin and hydrolyzing the latter compound to dl-valine. This reaction employing ammonium carbonate as the ammonium salt, can be indicated graphically as follows:

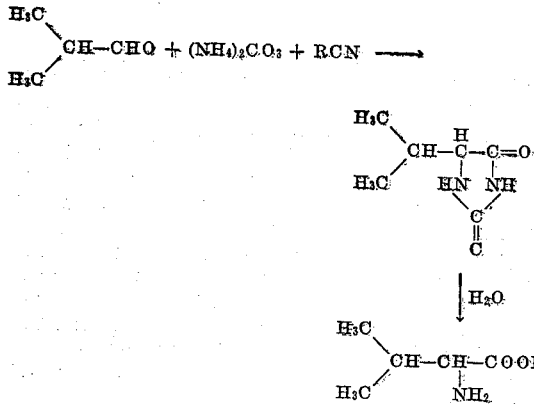

wherein R represents alkali metal cyanides, alkaline earth metal cyanides and magnesium cyanide.

The reaction may be carried out in an aqueous medium, or in a solution containing water and a water-soluble organic solvent. Organic solvents such as the alcohols are particularly suitable, and we have secured very good results by carrying out the reaction in an aqueous methanol medium. Other lower aliphatic alcohols in aqueous solution may be utilized with satisfactory results.

Inorganic cyanides, such as alkali metal cyanides, alkaline earth metal cyanides and magnesium cyanide, may be employed as reactants. Generally, however, we prefer to utilize the alkali metal cyanides and ammonium cyanide, and the term "alkali metal cyanides" or "alkali metal cyanides" as herein utilized, is construed as including ammonium cyanide.

Ammonium carbonate, or equivalent ammonium salts such as ammonium bicarbonate and ammonium carbamate, may be used as reactants in our improved process for preparing dl-valine.

It has been found that increasing the quantities of the ammonium salt and inorganic cyanide does not materially affect the yield.

The hydrolysis of 5-isopropyl hydantoin may be carried out either in an aqueous solution of a base such as sodium or potassium hydroxide or in an acid medium such as sulfuric or hydrochloric acid.

In accordance with a preferred embodiment of our invention ammonium carbonate is dissolved either partially or completely in water. Commercial ammonium carbonate is a mixture of ammonium bicarbonate and ammonium carbamate. The proportions of these components vary slightly with each sample causing variations in the solubility of the ammonium carbonate in water. It has been observed that there is no significant difference in the yield of dl-valine obtained in accordance with the present process between mixtures in which the ammonium carbonate is not all in solution and mixtures in which complete solubility of the ammonium carbonate is obtained. For best results, however, it is recommended that the ammonium carbonate titrate approximately 30% ammonia or better. Since dissolving ammonium carbonate in water is an endothermic reaction, it may be necessary to heat the mixture to maintain the reaction at room temperature. Upon the addition of each reactant to the reaction mixture, a specific length of time of stirring has been designated in an attempt to minimize differences in ammonium carbonate samples through establishing of equilibrium conditions. While the periods of time required for each addition varies with the ammonium salt employed and may not be critical, it would be well to adhere to them. Upon addition of the first reactant, sodium cyanide, to the slurry, the mixture is stirred for fifteen minutes. Methanol is then added and the mixture stirred for an additional fifteen minutes. Isobutyraldehyde is then introduced gradually into the mixture and the mixture heated at 50–55° C. for two and a half hours and filtered. The residue, consisting of inorganic salts, is slurried with hot methanol. The filtrate and washings containing 5-isopropyl hydantoin are combined and concentrated to a small volume under reduced pressure.

While the concentrate can be hydrolyzed directly to dl-valine, in some instances recovery of 5-isopropyl hydantoin in crystalline form may be necessary or desirable. This can be accomplished by first acidifying the solution in order to cyclize any hydantoic acid which might be present. The solution is then evaporated to dryness and 5-isopropyl hydantoin crystallized from ethanol. The 5-isopropyl hydantoin can then be hydrolyzed to dl-valine.

Alternatively, the 5-isopropyl hydantoin concentrate obtained in the manner described above can be hydrolyzed with an aqueous sodium hydroxide solution. Foaming which occurs during the hydrolysis can be reduced by passing a slow stream of nitrogen over the reaction mixture. When hydrolysis is complete, the reaction mixture is acidified with hydrochloric acid and treated with activated charcoal. The mixture is then filtered and the filtrate is evaporated to dryness under reduced pressure. The residue, dl-valine hydrochloride is extracted with methanol. The free amino acid, dl-valine, is precipitated from aniline, pyridine, or ammonium hydroxide. The crude crystals are recovered, dissolved in hot water, and recrystallized from ethanol.

The following example illustrates a method of carrying out the invention but it is to be understood that this example is given by way of illustration and not of limitation.

*Example*

210 grams (2.2 moles) of ammonium carbonate, which titrates 30–33% ammonia when assayed according to the method described in "Reagent Chemicals and Standards," Rosin, page 34, is added to 250 cc. of water. This mixture is stirred at 20–25° C. for 45 minutes. Since the solution of ammonium carbonate in water is an endothermic reaction, it may be necessary to heat the mixture to keep the temperature between the prescribed limits. The solubility of ammonium carbonate in water is not uniform and some of the solid may not dissolve depending upon the quality of ammonium carbonate used. To the slurry thus obtained is added 54 grams (1.1 moles) of sodium cyanide. After the mixture has been stirred for 15 minutes, 250 cc. of methanol is added and the mixture is stirred for an additional 15 minutes. During the latter two additions, the temperature rises to about 25° C. and additional inorganic salts separate. 72.06 grams (1.0 mole) of isobutyraldehyde, is added gradually to the mixture. The addition of the aldehyde requires several minutes and increases the temperature of the mixture to 45° C. The mixture is heated and stirred at 50–55° C. inside temperature, for 2½ hours, at the end of which time it is cooled to 40° C. and filtered. The inorganic salts are slurried with 2 x 50 cc. of hot methanol, and the filtrate and washings containing 5-isopropyl hydantoin are combined and concentrated to 300 cc. at 75–80° C. under reduced pressure.

Crystalline 5-isopropyl hydantoin may be recovered by acidifying the filtered reaction mixture with concentrated hydrochloric acid using Congo red as an indicator and heating the acid solution for five minutes at 90° C. to cyclize any hydantoic acid. The solution is evaporated to dryness under reduced pressure at 60° C. and is then extracted with hot ethanol while being treated with activated charcoal. Upon cooling 5-isopropyl hydantoin crystals separate from solution. These crystals have a melting point of 142–144° C. On recrystallization from ethanol, the product melts at 145° C.

To the 300 cc. concentrated 5-isopropyl hydantoin solution obtained above is added 132 grams (3.3 moles) of sodium hydroxide dissolved in 400 cc. of water. The solution is refluxed at 103–107° C. for 24 hours. If concentration has not been carried far enough, refluxing may start at about 95° C. The temperature should gradually rise over 3–5 hours to 105° C. Alternatively, hydrochloric acid or sulfuric acid can be added to the 5-isopropyl hydantoin concentrate and the solution refluxed. In order to reduce foaming which occurs during hydrolysis, a slow stream of nitrogen may be passed over the reaction mixture. When hydrolysis is complete the reaction mixture is cooled and acidified with 400 cc. concentrated hydrochloric acid. The solution after acidification should be definitely acid to Congo red paper. About 350 cc. of acid is needed to make the mixture just acid to Congo red, and about 50 cc. excess is added. The acid solution thus obtained is then treated with 10 grams of activated charcoal and filtered. The acid solution before treatment with activated charcoal contained a small amount of green solid which may have been silicic in nature. This filtered out, however, giving a yellow colored solution. The filtrate is evaporated to dryness under reduced pressure at 60–70° C. The solid residue is extracted with 2 x 300 cc. of hot methanol, treating with 10 grams of activated charcoal in the process. The mixture is filtered and 150 cc. of aniline is added to the filtrate. The mixture is then brined and stirred for 24 hours. Some solid dl-valine hydrochloride may separate on filtering if the filtrate is cooled sufficiently by the evaporation of methanol. Most of the solid can be redissolved by warming the alcohol. If the solid is present in only small amounts, it will dissolve upon the addition of the aniline and stirring. The solution after the addition of aniline should not show acidity to moist Congo red paper. About 110 cc. of aniline is needed to obtain neutrality and about 40 cc. excess is added. The crude dl-valine is filtered, washed with 2 x 25 cc. of ether and dried. Approximately 84 grams of crude dl-valine is obtained. The crude dl-valine is dissolved in a minimum amount of hot water (500–600 cc.), treated with 6 grams of activated charcoal and filtered. To the filtrate is added an equal volume of ethanol and the solution is allowed to stand overnight. The pure dl-valine, which crystallized from solution, is filtered, washed consecutively with 25 cc. of a mixture of equal volumes of water and alcohol, 50 cc. ethanol and finally with 50 cc. of ether.

Various changes and modifications of our invention as described above may be made which would still be within the scope thereof. Accordingly, such changes and modifications, to the extent that they are within the purview of the appended claims are to be regarded as part of our invention.

We claim:

1. The process of preparing dl-valine which comprises hydrolyzing 5-isopropyl hydantoin with an aqueous alkali metal hydroxide medium at atmospheric pressure.

2. The process of preparing dl-valine which comprises heating 5-isopropyl hydantoin in an aqueous sodium hydroxide medium at atmospheric pressure.

DALE P. J. GOLDSMITH.
MAX TISHLER.

REFERENCES CITED

The following references are of record in the file of this patent:

FOREIGN PATENTS

| Number | Country | Date |
|--------|---------|------|
| 566,094 | Germany | Dec. 14, 1932 |

(Other references on following page)

OTHER REFERENCES

Urech, "Liebigs Annalen," vol. 164, pp. 264–271 (1872).

Heintz, "Liebigs Annalen," vol. 169, pp. 125–127 (1873).

Pinner et al., "Ber. deut. chem.," vol. 22, pp. 695, 696 (1889).

Bergmann et al., "Liebigs Annalen," vol. 458 (1927), pp. 83, 86, 90, 91, 92.

Bucherer et al., "J. Prak Chem.," vol. 141, p. 25 (1934).

Boyd et al., "Biochem J.," vol. 29 (1935), p. 553.

Sidgwick, "Organic Chemistry of Nitrogen," 1937, Oxford Univ. Press (London), p. 117.

Houben, "Die Methoden der Organischen Chemie," 3rd ed., vol. 4 (1941), p. 789.